United States Patent [19]
Gardlund et al.

[11] Patent Number: 4,673,722
[45] Date of Patent: Jun. 16, 1987

[54] HIGH IMPACT NYLON/POLYUREA COPOLYMER

[75] Inventors: Zachariah G. Gardlund, Utica; MaryAnn Bator, Mt. Clemens, both of Mich.

[73] Assignee: General Motors Corporation, Detroit, Mich.

[21] Appl. No.: 812,762

[22] Filed: Dec. 23, 1985

[51] Int. Cl.$^4$ .............................................. C08G 18/34
[52] U.S. Cl. ......................................... 528/73; 528/61; 528/68; 528/76
[58] Field of Search ..................... 528/73, 76, 61, 68

[56] References Cited
U.S. PATENT DOCUMENTS
4,154,773 5/1979 Hergenrother et al. ............ 260/852

Primary Examiner—Maurice J. Welsh
Attorney, Agent, or Firm—Randy W. Tung

[57] ABSTRACT

A method of forming a high impact strength article of nylon/polyurea copolymer by reaction injection molding precursors of a polyurea prepolymer and a caprolactam together including the steps of prereacting a diisocyanate, a diamine and caprolactam to form a polyurea prepolymer having carbamyl caprolactam terminated end groups and then rapidly mixing the prepolymer with suitable amounts of caprolactam and a caprolactam alkali metal salt initiator and adding the mixture to a heated mold to polymerize the mixture and form the article.

10 Claims, No Drawings

HIGH IMPACT NYLON/POLYUREA COPOLYMER

FIELD OF THE INVENTION

The present invention generally relates to a nylon/polyurea copolymer that can be readily processed in a reaction injection molding process, more particularly, is concerned with a nylon/polyurea copolymer that can be rapidly processed in a reaction injection molding process producing a copolymer having high impact strength.

BACKGROUND OF THE INVENTION

The process of reaction injection molding (RIM) has been rapidly developed and widely used in recent years. A variety of materials have been developed at the same time to utilize this process. Most of these materials, for instance polyurethane RIM and epoxy RIM, are thermoset polymers that are amorphous in nature. They generally have good mechanical strength and physical properties adequate for many automotive applications. For instance, polyurethane RIM has been widely used for automotive bumpers because of its good physical properties and its easy processibility.

In some applications such as automobile body panels, only materials having very high impact strength and thermal stability can be used. Since the body panels have to go through paint ovens, the heat distortion temperature of a polyurethane RIM cannot meet such requirement. To meet such high temperature requirement, other types of semi-crystalline RIM material of higher mechanical strength have recently been developed. One of such materials is a nylon-6 and polyurethane copolymer that can be processed by a RIM method. However, we have found that this material is not thermally stable and its physical properties are easily deteriorated by exposure to moisture.

It is therefore an object of the present invention to provide a nylon/polyurea copolymer processible by a RIM method which has good thermal stability.

It is yet another object of the present invention to provide a nylon/polyurea copolymer processible by a RIM method which has good thermal stability and impact strength adequate for use in high impact automotive applications.

SUMMARY OF THE INVENTION

In accordance with a preferred practice of my invention, a nylon/polyurea copolymer having good thermal stability and high impact strength may be produced by a reaction injection molding method. This copolymer may be rapidly processed in a reaction injection molding machine to produce a high temperature part with very high impact strength. The chemistry involved in the preparation includes two steps. First, a polyurea prepolymer having carbamyl caprolactam terminated end groups is synthesized. The molecular weight of this prepolymer is in the range of 2,000 to 40,000. This polyurea prepolymer is then dissolved in caprolactam, forming a solution which constitutes the A-part of a two-part RIM system.

The B-part of the RIM system consists of caprolactam and an initiator of caprolactam alkali metal salt. In the second step of the process, combination of part A and part B reactants result in a very fast polymerization of caprolactam to produce a block copolymer of the A-B-A type.

Two essential conditions must be met in the synthesis or our novel high impact nylon/polyurea copolymer. First, the molecular weight of the polyurea prepolymer must be high enough, i.e., in the range of 2,000 to 40,000 and secondly, the concentration of polyurea in the copolymer must fall in the range between 25 to 70% of the total weight of the copolymer in order to ensure the incorporation of polyurea into the nylon matrix as a block copolymer. The impact strength achieved by our novel nylon/polyurea polymer is more than thirty-fold of that of a regular thermoplastic nylon product.

DETAILED DESCRIPTION OF A PREFERRED EMBODIMENT

The major objectives to be achieved in the development of our novel nylon/polyurea copolymer for a reaction injection molding process are the impact strength of the resulting part, rapidity of polymerization and crystallization, and long term thermal stability.

Our novel nylon/polyurea copolymer is polymerized by using a mixture consisting of 95 to 50 parts by weight of caprolactam, 4 to 49 parts by weight of a polyurea, and less than 1 part by weight of a caprolactam alkali metal salt initiator. The polyurea prepolymer may be made from the class of amine terminated polyols, amine terminated polybutadienes, amine terminated polyacrylonitrile-co-butadienes, etc. The chemical structure of the rubbery portion is less important than the fact that urea linkages are formed and resulting polymer is of a correct molecular weight range. The high impact strength of our novel copolymer arises from a strong interfacial adhesion between the rubbery phase, i.e., polyurea, and the nylon amorphous/crystalline phases. Strong interfacial adhesion is obtained when nylon block copolymers having the general formula nylon-polyurea-nylon are produced. This interaction develops high impact strength by insuring excellent energy transfer from the nylon matrix to the rubbery polyurea segments.

The rapidity of the polymerization process of our novel copolymer with resultant fast crystallization is developed by the alkyl carbamyl caprolactam end groups on the polyurea prepolymer. We have found that in building an impact modifier, the generation of a chemical linkage in the copolymer between the nylon and the rubbery segment which will not decompose with time is very important. We discovered that the urea group is much more stable than possible alternatives such as ester or urethane.

The synthesis of our novel nylon/polyurea copolymer is performed by two steps. In the first step, a polyurea prepolymer of suitable molecular weight is first synthesized. This can be performed as follows: First, $1.25 \times 10^{-1}$ mole of 1,6-hexamethylene diisocyanate, $8 \times 10^{-2}$ mole of caprolactam, and 200 ml tetrahydrofuran are placed into a Morton flask fitted with mechanical stirrer, condenser, and inert gas inlet/outlet under an inert atmosphere. The reaction is stirred for 4.5 hours at the reflux temperature of the solvent. $1 \times 10^{-1}$ mole of Jeffamine D-2000 is dissolved in 200 ml tetrahydrofuran and added drop-wise during one hour. 600 ml tetrahydrofuran are then added and reaction is continued at reflux for twenty hours before cooling to room temperature. Flash evaporation of the solvent yielded a rubbery and transparent polyurea prepolymer. The structural formula of the polyurea prepolymer having carbamyl caprolactam terminated end groups is shown as follows:

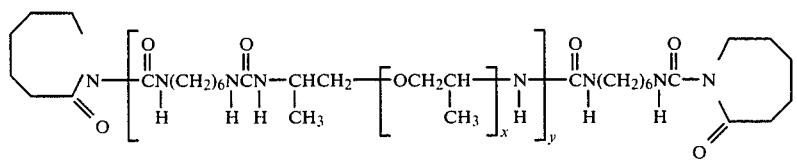

In the second step of synthesis of our novel nylon/-polyurea copolymer, $7 \times 10^{-4}$ to $6.7 \times 10^{-3}$ mole carbamyl caprolactam terminated polyurea and 0.6 to 1.4 mole of caprolactam are placed into an oven dried jar fitted with a thermocouple and argon gas bubbler. The jar is then heated in a 140° C. oil bath. Another similarly equipped jar containing 0.27 mole of caprolactam is also placed in the 140° C. oil bath. $8 \times 10^{-3}$ to $3 \times 10^{-2}$ mole of sodium hydride is then 8 x 10-3 to 3 x 10 slowly added to the molten caprolactam to generate a solution of sodium caprolactamate in caprolactam. When the contents of both jars are at 140° C., they are combined with rapid stirring in a third hot dry container and rapidly poured into a preheated 140° C. plaque mold. The mold is then placed in an oven to complete the reaction. After cooling to room temperature in the mold, a light tan colored plaque was obtained and stored in a dry atmosphere. The structural formula of a repeating mer unit of our novel copolymer is shown as follows:

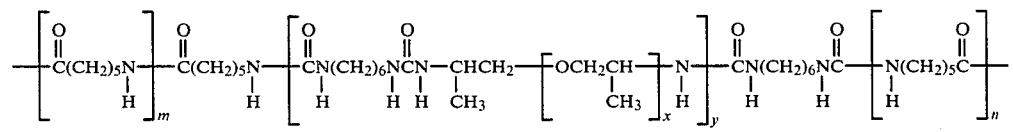

The names of the chemicals we used, their trade name of catalog numbers, physical states, and suppliers are illustrated in table 1.

TABLE 1

| Chemical | Trade Name or Catalog Number | Physical State | Supplier |
|---|---|---|---|
| Sodium hydride | #22,344-1 | Powder | Aldrich Chemical |
| Caprolactam | C220-4 | Grannular solid | Aldrich Chemical |
|  |  | Grannular solid | Nipro, Inc. |
| Amine terminated poly(propylene oxide) | Jeffamine D-2000 | Clear liquid | Texaco Chemical Co. |
| 1,6-hexamethylene diisocyanate | #D12 470-2 Mondur HX | Clear liquid Clear liquid | Aldrich Chemical Mobay |
| Tetrahydrofuran | #T424-4 | Clear liquid | Fisher |

A series of nylon/polyurea block copolymers of varying nylon/polyurea weight ratios are prepared by following this method. After a test plaque is obtained, the Izod impact strength, the percent crystallinity, the onset melting temperature of each composition are determined. These weight ratios and physical properties are shown in table 2.

TABLE 2

| Block* Copolymer (Nylon Wt %/ Polyurea Wt %) | Dry Izod Impact Strength (J/M) | Percent Crystallinity | Onset Melting Temperature (°C.) |
|---|---|---|---|
| 100/0 | 20 | 40 | 210 |
| 90/10 | 90 | 40 | 208 |
| 80/20 | 150 | 35 | 205 |
| 75/25 | 650 | 32 | 205 |
| 70/30 | 800 | 33 | 200 |
| 65/35 | no break | 26 | 198 |
| 60/40 | no break | 19 | 194 |
| 50/50 | no break | 20 | 180 |

*Block copolymer designation, e.g., 70/30 = 70 weight percent nylon, 30 weight perrcent polyurea.

Note that in table 2, the weight ratios of nylon to polyurea are calculated neglecting the weight percent of the initiator used which is insignificant. The series of nylon/polyurea block copolymers shown in table 2 encompasses the range between 100 weight percent nylon/0 weight percent polyurea (100/0) to 50 weight percent/50 weight percent polyurea (50/50). It should be noted that, between the composition range change from 80/20 to 70/30, a sudden jump of Izod impact strength is observed, i.e., the impact strength increases from 150 J/m to 800 J/m. We suspect this occurs when sufficient chemical linkages are made in the copolymer between the nylon and the rubbery segments of polyurea.

At still higher concentrations of polyurea, i.e., at 65/35, 60/40, and 50/50, the Izod impact strength could not be determined because samples failed to break indicating an impact strength larger than 1000 J/m. It is also seen from table 2 that the percent crystallinity decreases as expected when the weight percent of polyurea is increased in the block copolymer composition. Similarly, the onset melting temperatures of the block copolymers decrease as the weight percent of polyurea is increased in the block copolymer composition.

We have discovered that in order to achieve high impact strength, a proper concentration of polyurea, i.e., larger than 25 weight percent must be incorporated in the nylon/polyurea copolymer. To further prove this essential condition for achieving high impact strength, we have also synthesized a copolymer using prepolymer without caprolactam end groups dispersed in an anionically polymerized nylon 6. In this synthesis, $5.2 \times 10^{-3}$ mole of polyurea terminated with non-reactive hexyl groups was heated together with 0.6 mole caprolactam and $7.0 \times 10^{-3}$ mole of hexamethylene dicarbamyl dicaprolactam in a dry test tube equipped with argon gas bubbler and thermocouple. In a separate similarly equipped test tube was placed 0.4 mole of caprolactam. Both test tubes were immersed in an oil bath at 140° C. Sodium hydride was added in small portions to the caprolactam in the second test tube to generate a solution of sodium caprolactamate in caprolactam. When the contents of the two test tubes had reached 140° C., they were poured into a dry hot jar, rapidly stirred, and poured into a preheated plaque mold. The mold was placed in an oven to complete the polymerization. After removal from the oven and cooling to room temperature, the light tan colored plaque was removed from the mold and stored in a dry atmosphere. The notched Izod strength obtained on a minimum of 10 samples was 90 J/m. This impact strength is only 1/10 of that for the copolymer synthesized by the preferred embodiment in which 30 weight percent polyurea terminated with reactive caprolactam end groups was used.

We have further discovered that a second essential condition must also be met in order to produce our novel high impact nylon/polyurea block copolymer, i.e., the molecular weight of the polyurea prepolymer used in the polymerization of the copolymer must be high enough. We have demonstrated this by anionic polymerization of caprolactam in the presence of a caprolactam terminated low molecular weight prepolymer. In this synthesis, $2.9 \times 10^{-2}$ mole of carbamyl caprolactam terminated polyurea and 1.2 mole of caprolactam were mixed in an oven dried jar fitted with an argon gas bubbler and a thermocouple. The jar was placed in a 140° C. oil bath. $2.5 \times 10^{-2}$ mole of sodium hydride was added to 0.27 mole molten caprolactam contained in a second similarly equipped jar in the heated oil bath. The contents were combined at 140° C. and a plaque was molded in a heated mold. A low Izod impact strength of 24 J/m was obtained on a set of 10 samples.

We have therefore demonstrated the necessities of using both a high molecular weight polyurea prepolymer and a proper concentration of which to ensure the incorporation of the polyurea segments into the nylon matrix in order to produce our novel high impact strength copolymer.

While our invention has been described in terms of a preferred embodiment thereof, it is to be appreciated that those skilled in the art will readily apply these teachings to other possible variations of the invention.

The embodiments of the invention in which an exclusive property or privilege is claimed are defined as follows:

1. A method of forming a high impact strength article of nylon/polyurea copolymer by reaction injection molding a polyurea prepolymer and a caprolactam together comprising the steps of rapidly mixing a polyurea prepolymer with suitable amounts of caprolactam and a caprolactam alkali metal salt initiator and adding said mixture to a heated mold to polymerize said mixture and therein form said article with the proviso that the molecular weight of the polyurea is 2,000 to 40,000 and that the concentration of polyurea in the copolymer is 25 to 70%.

2. A method of forming a high impact strength article of nylon/polyurea copolymer by reaction injection molding a polyurea prepolymer and a caprolactam together, comprising
    (1) prereacting a diisocyanate, a diamine and caprolactam to form a prepolymer of polyurea having carbamyl caprolactam terminated end groups and thereafter,
    (2) rapidly mixing said prepolymer with suitable amounts of caprolactam and a caprolactam alkali metal salt initiator and adding said mixture to a heated mold to polymerize said mixture and therein form said article with the proviso that the molecular weight of the polyurea is 2,000 to 40,000 and that the concentration of polyurea in the copolymer is 25 to 70%.

3. A method of forming a high impact strength article of nylon/polyurea copolymer by reaction injection molding a polyurea prepolymer and a caprolactam together, comprising
    (1) prereacting a diisocyanate, a diamine and caprolactam to form a prepolymer of polyurea having carbamyl caprolactam terminated end groups and a molecular weight between 2,000 to 40,000 and thereafter,
    (2) rapidly mixing between 4 to 49 weight percent of said prepolymer with 95 to 50 weight percent of caprolactam and less than 1 weight percent of a caprolactam alkali metal salt initiator selected from the group containing sodium caprolactamate, lithium caprolactamate, and potassium caprolactamate and adding said mixture to a heated mold to polymerize said mixture and therein form said article with the proviso that the molecular weight of the polyurea is 2,000 to 40,000 and that the concentration of polyurea in the copolymer is 25 to 70%.

4. A carbamyl caprolactam terminated polyurea prepolymer having the following structural formula:

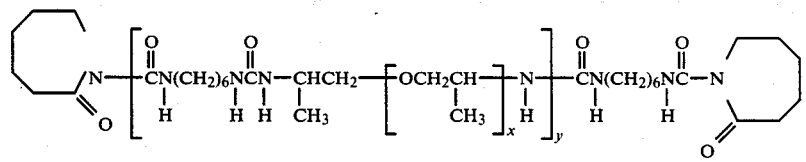

wherein x may vary from 7 to 70 and y may vary from 1 to 20.

5. A high impact strength nylon/polyurea copolymer which is the polymerization reaction product of:
    (a) between 4 to 49 weight percent of carbamyl caprolactam terminated polyurea prepolymer having the following structural formula:

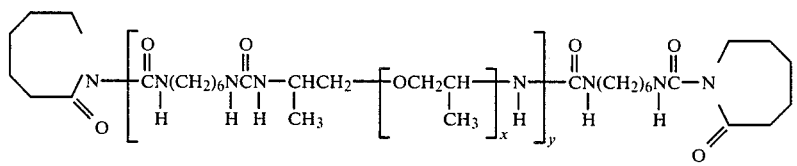

wherein x may vary from 7 to 70 and y may vary from 1 to 20;

(b) between 95 to 50 weight percent of caprolactam; and (c) less than 1 weight percent of a caprolactam alkali metal salt initiator.

6. A high impact strength nylon/polyurea copolymer consisting essentially of repeating mer units of the following structural formula:

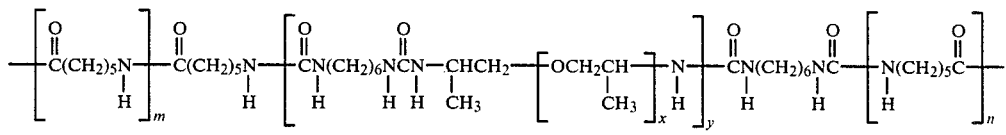

wherein m and n may vary between 10 to 1000, x may vary between 7 to 70, and y may vary between 1 to 20.

7. A method according to claim 3 wherein said high impact strength article of nylon/polyurea copolymer is made from a carbamyl caprolactam terminated polyurea prepolymer having a molecular weight between 10,000 to 20,000.

8. A composition according to claim 4 wherein x may vary from 30 to 35 and y may vary from 5 to 10.

9. A composition according to claim 5 wherein x may vary from 30 to 35 and y may vary from 5 to 10.

10. A composition according to claim 5 wherein the caprolactam alkali metal salt initiator is selected from the group containing sodium caprolactamate, lithium caprolactamate, and potassium caprolactamate.

* * * * *